(12) United States Patent
Kim et al.

(10) Patent No.: US 11,002,945 B2
(45) Date of Patent: May 11, 2021

(54) OPTICAL LENS SYSTEM

(71) Applicant: ELCOMTEC CO., LTD., Pyeongtaek-si (KR)

(72) Inventors: Se Jin Kim, Seoul (KR); Jae Hoon Cho, Suwon-si (KR); Sun Myung Kang, Osan-si (KR)

(73) Assignee: ELCOMTEC CO., LTD., Pyeongtaek-si (KR)

( * ) Notice: Subject to any disclaimer, the term of this patent is extended or adjusted under 35 U.S.C. 154(b) by 218 days.

(21) Appl. No.: 16/393,891

(22) Filed: Apr. 24, 2019

(65) Prior Publication Data
US 2019/0265443 A1    Aug. 29, 2019

Related U.S. Application Data

(63) Continuation of application No. PCT/KR2017/011562, filed on Oct. 19, 2017.

(30) Foreign Application Priority Data

Oct. 25, 2016   (KR) .................. 10-2016-0138969

(51) Int. Cl.
*G02B 13/00* (2006.01)
*G02B 9/62* (2006.01)
(Continued)

(52) U.S. Cl.
CPC .......... *G02B 13/0045* (2013.01); *G02B 5/20* (2013.01); *G02B 9/62* (2013.01); *G02B 13/00* (2013.01); *G02B 13/06* (2013.01); *G03B 7/085* (2013.01)

(58) Field of Classification Search
CPC ....... G02B 13/0045; G02B 9/62; G02B 13/06
See application file for complete search history.

(56) References Cited

U.S. PATENT DOCUMENTS 9,374,513 B2   6/2016   Chen et al.
9,377,605 B2   6/2016   Chung et al.
(Continued)

FOREIGN PATENT DOCUMENTS

CN   104238084 A   12/2014
CN   104516094 A   4/2015
(Continued)

OTHER PUBLICATIONS

International Search Report issued in PCT/KR2017/011562; dated Jan. 30, 2018.
(Continued)

*Primary Examiner* — Wen Huang
(74) *Attorney, Agent, or Firm* — Studebaker & Brackett PC (57) ABSTRACT

An optical lens system is disclosed. The optical lens system includes a first lens that has negative refractive power, a second lens that has positive refractive power, a third lens that has positive refractive power, a fourth lens that has refractive power, a fifth lens that has positive refractive power, a sixth lens that has negative refractive power, an aperture located between the second lens and the third lens, and conditional expressions of "$-1.4<\tan\theta/f<-1.1$" and "$4.0<TTL/BFL<6.0$" are satisfied when $\theta$ is an angle of view of the optical lens system in a diagonal direction, f is a focal length of the optical lens system, TTL is a distance on an optical axis from the object-side surface of the first lens to the sensor, and BFL is a distance on the optical axis from the sensor-side surface of the sixth lens to the sensor.

16 Claims, 4 Drawing Sheets

(51) Int. Cl.
  *G02B 13/06* (2006.01)
  *G02B 5/20* (2006.01)
  *G03B 7/085* (2021.01)

(56) References Cited

U.S. PATENT DOCUMENTS

| | | | |
|---|---|---|---|
| 9,557,534 B1 * | 1/2017 | Liao | G02B 13/0045 |
| 10,054,766 B2 | 8/2018 | Shin et al. | |
| 10,215,959 B2 | 2/2019 | You | |
| 2014/0368931 A1 | 12/2014 | Noda et al. | |
| 2015/0098135 A1 | 4/2015 | Chung et al. | |
| 2015/0268446 A1 | 9/2015 | Chen et al. | |
| 2015/0350503 A1 | 12/2015 | Chen et al. | |
| 2016/0178871 A1 | 6/2016 | You | |
| 2016/0259150 A1 | 9/2016 | Shin et al. | |

FOREIGN PATENT DOCUMENTS

| | | |
|---|---|---|
| CN | 105717611 A | 6/2016 |
| CN | 105938238 A | 9/2016 |
| JP | 2014-044250 A | 3/2014 |
| KR | 2016-0075015 A | 6/2016 |
| KR | 2016-0108080 A | 9/2016 |
| TW | 201428336 A | 7/2014 |

OTHER PUBLICATIONS

Search Report mailed by the Chinese Patent Office dated Sep. 26, 2020, which corresponds to Chinese Patent Application No. 201780062497.1 and is related to U.S. Appl. No. 16/393,891.

Notice of Allowance mailed by the Chinese Patent Office dated Nov. 4, 2020, which corresponds to Chinese Patent Application No. 201780062497.1 and is related to U.S. Appl. No. 16/393,891.

* cited by examiner

OPTICAL LENS SYSTEM

CROSS-REFERENCE TO RELATED APPLICATIONS

The present application is a continuation of International Patent Application No. PCT/KR2017/011562, filed Oct. 19, 2017, which is based upon and claims the benefit of priority to Korean Patent Application No. 10-2016-0138969, filed on Oct. 25, 2016. The disclosures of the above-listed applications are hereby incorporated by reference herein in their entirety.

FIELD

The present disclosure relates to an optical lens system, and more particularly, to an optical lens system which may be mounted on an imaging camera module.

BACKGROUND

An imaging camera module includes an optical lens system including at least one lens and an image sensor that receives light passing through the optical lens system and converts the received light into an electric signal. Solid-state image sensing devices such as a charge coupled device (CCD) or a complimentary metal oxide semiconductor image sensor (CMOS image sensor) have commonly been used as image sensors.

Recently, camera modules have been widely employed in electronic devices such as smartphones, tablet computers, lab-top computers, and the like. Such electronic devices have advanced to become smaller and thinner in order to improve user convenience and aesthetic sense. The conventional camera devices also tend to grow smaller and thinner. In line with this, a camera module mounted on such an electronic device is also required to be small and thin.

Recent camera modules require a lens having a wide angle of view to capture a larger amount of information by one shot. However, it is difficult to design a lens which may have a wide angle of view, may be used in combination with a high-resolution image sensor, and may have excellent optical performance such as aberration and distortion.

Therefore, a high-performance optical lens system which is smaller, has a wide angle of view, and is used in combination with a high-resolution image sensor is required to be developed.

SUMMARY

An aspect of the present disclosure provides a high-performance optical lens system which is smaller, has a wide angle of view, and is used in combination with a high resolution image sensor.

Another aspect of the present disclosure provides an optical lens system which includes lenses formed of plastic and uses low-priced materials, thus achieving excellent economical efficiency.

According to an aspect of the present disclosure, there is provided an optical lens system including a first lens, a second lens, a third lens, a fourth lens, a fifth lens, and a sixth lens sequentially arranged from an object side to a sensor side between an object and a sensor on which an image of the object is focused, in which the first lens has negative refractive power and a sensor-side surface of the first lens is concave in a paraxial region, the second lens has positive refractive power, the third lens has positive refractive power and an object-side surface of the third lens is convex in the paraxial region, the fourth lens has refractive power, an object-side surface of the fourth lens is convex in the paraxial region and concave on the periphery of an effective diameter of the paraxial region, a sensor-side surface of the fourth lens is concave in the paraxial region, both an object-side surface and a sensor-side surface of the fourth lens are aspheric, the fifth lens has positive refractive power, an object-side surface of the fifth lens is concave in the paraxial region and aspheric, the sixth lens has negative refractive power, a sensor-side surface of the sixth lens is concave and has at least one inflection point in the effective diameter, both an object-side surface and a sensor-side surface of the sixth lens are aspheric, an aperture is located between the second lens and the third lens, and the following conditional expression is satisfied when θ is an angle of view of the optical lens system in a diagonal direction, f is a focal length of the optical lens system, TTL is a distance on an optical axis from the object-side surface of the first lens to the sensor, and BFL is a distance on the optical axis from the sensor-side surface of the sixth lens to the sensor.

$-1.4 \tan \theta/f < -1.1$ $4.0 < TTL/BFL < 6.0$ <Conditional Expression>

In an embodiment of the present disclosure, the object-side surface of the sixth lens may be convex in the paraxial region and concave on the periphery in the effective diameter of the paraxial region.

In an embodiment of the present disclosure, an object-side surface of the first lens may be convex in the effective diameter.

In an embodiment of the present disclosure, an object-side surface of the second lens may be concave in the effective diameter.

In an embodiment of the present disclosure, a sensor-side surface of the third lens may be convex in the paraxial region.

In an embodiment of the present disclosure, a sensor-side surface of the fifth lens may be convex in the paraxial region.

In an embodiment of the present disclosure, the fourth lens may be formed of a material having a refractive index of 1.6 or greater.

In an embodiment of the present disclosure, the sixth lens may be formed of a material having a refractive index of 1.6 or greater.

In an embodiment of the present disclosure, the fourth lens and the sixth lens may be formed of a material having a refractive index of 1.6 or greater, and the refractive index of the material forming the fourth lens may be greater than the refractive index of the material forming the sixth lens.

In an embodiment of the present disclosure, the first lens, the second lens, the third lens, and the fifth lens may be formed of a material having a refractive index of 1.5 to 1.6.

In an embodiment of the present disclosure, at least one of the fourth lens and the sixth lens may be formed of plastic.

In an embodiment of the present disclosure, the fourth lens may have negative refractive power.

In an embodiment of the present disclosure, the following conditional expression may further be satisfied when f1 is a focal length of the first lens.

$-1.7 < f1/f < -1.4$ <Conditional Expression>

In an embodiment of the present disclosure, the following conditional expression may further be satisfied when V1 is the Abbe number of the first lens and V2 is the Abbe number of the second lens.

$50 < (V1+V2)/2 < 60$ <Conditional Expression>

In an embodiment of the present disclosure, the following conditional expression may further be satisfied when CRA (MAX) is a maximum value of a chief ray angle of the optical lens system.

30.0 deg<CRA(MAX)<35.0 deg     <Conditional Expression>

In an embodiment of the present disclosure, the following conditional expression may further be satisfied when FSL is a distance on the optical axis between the object-side surface of the first lens and the aperture.

0.2<*FSL/TTL*<0.3     <Conditional Expression>

The optical lens system according to an embodiment of the present disclosure is small, has a wide angle of view, and can be used in combination with a high resolution image sensor.

Further, since the optical lens system according to an embodiment of the present disclosure includes the lenses formed of plastic and uses low-priced materials, excellent economical efficiency may be achieved.

DETAILED DESCRIPTION

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof will be omitted. The terms used henceforth are used to appropriately express the embodiments of the present disclosure and may be altered according to a person of a related field or conventional practice. Therefore, the terms should be defined on the basis of the entire content of this specification.

Hereinafter, an optical lens system according to a first embodiment of the present disclosure will be described with reference to FIG. 1.

Figure 1:
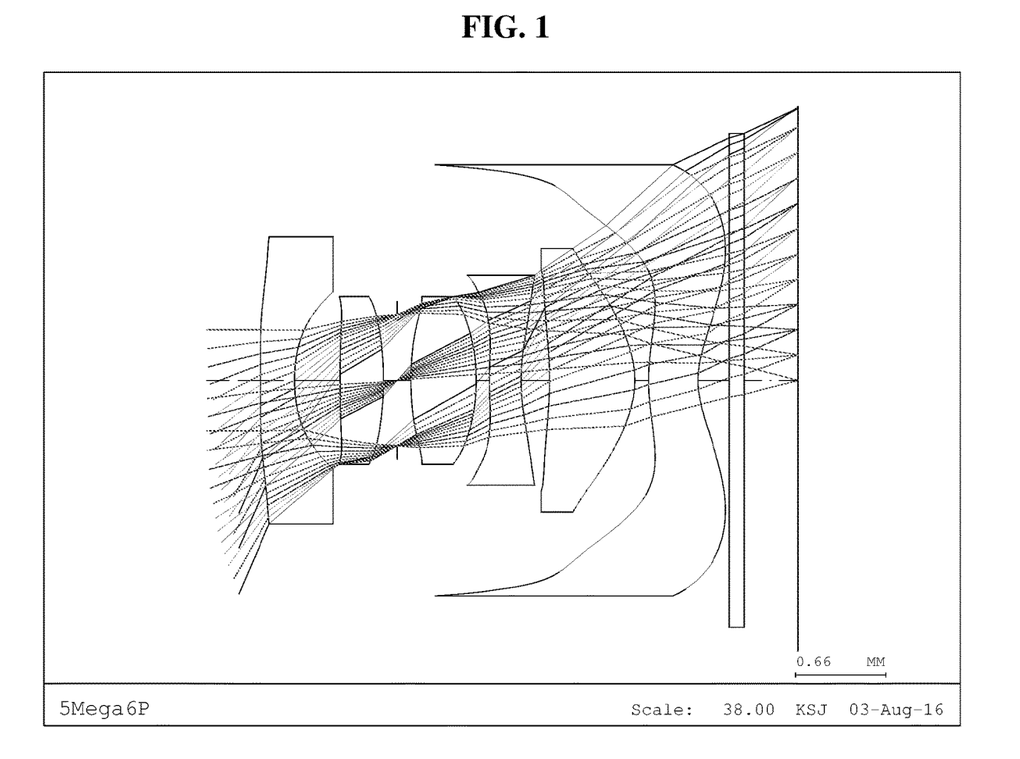
FIG. 1 is a view illustrating a configuration of lenses of an optical lens system according to a first embodiment of the present disclosure.

FIG. 1 is a view illustrating a configuration of an optical lens system according to an embodiment of the present disclosure.

Referring to FIG. 1, an optical lens system according to the present disclosure includes a first lens L1, a second lens L2, a third lens L3, a fourth lens L4, a fifth lens L5, and a sixth lens L6 are located between an object corresponding to a subject and a sensor IS on which an image of the object is focused. The first to sixth lenses L1, L2, L3, L4, L5, and L6 are sequentially arranged from the object side to the sensor IS side.

Each of the lens has opposing surfaces facing each other. In one lens, a surface facing the object side corresponds to an entry surface through which light enters the lens. Further, in one lens, a surface facing the sensor IS side corresponds to an exit surface through which light exits. In this embodiment, a surface which is an object-side surface and an entry surface of an nth lens is denoted by Sn1 and a surface which is a sensor-side surface and an exit surface of the nth lens is denoted by Sn2. Accordingly, an object-side surface and entry surface of the first lens L1 is denoted by S11, and a sensor-side surface and exit surface thereof is denoted by S12. Also, an object-side surface and entry surface of the second lens L2 is denoted by S21, and a sensor-side surface and exit surface thereof is denoted by S22. Also, an object-side surface and entry surface of the third lens L3 is denoted by S31, and a sensor-side surface and exit surface thereof is denoted by S32. Also, an object-side surface and entry surface of the fourth lens L4 is denoted by S41, and a sensor-side surface and exit surface thereof is denoted by S42. Also, an object-side surface and entry surface of the fifth lens L5 is denoted by S51, and a sensor-side surface and exit surface thereof is denoted by S52. Also, an object-side surface and entry surface of the sixth lens L6 is denoted by S61, and a sensor-side surface and exit surface thereof is denoted by S62.

The optical lens system includes an aperture S. The aperture S may be located to cover a sensor the second lens L2 and the third lens L3. In some cases, the aperture S may be located over the sensor-side surface S22 of the second lens L2. The aperture S may block a partial amount of light to adjust the amount of light irradiated into the optical lens system.

The optical lens system may include an optical filter OF. The optical filter OF may be located between the sixth lens L6 and the sensor IS. The optical filter OF may block light other than light of a band detected by the sensor IS. More specifically, the optical filter OF may block light of an infrared band when the sensor IS is an image sensor detecting visible light, and block light of a visible light band when the sensor IS is an image sensor detecting an infrared ray.

The sensor IS may be an image sensor IS which receives light passing through the lenses and converts the received light into an electric signal. The sensor IS is located on a rear surface of the sixth lens L6 so that light passing through the first to sixth lenses L1 to L6 forms an image on the object-side surface of the sensor IS.

Each of the lenses of the optical lens system of the present disclosure has the following characteristics.

The first lens L1 has negative (−) refractive power. The object-side surface S11 of the first lens L1 is convex in an effective diameter, and the sensor-side surface S12 thereof is concave in a paraxial region. The object-side surface S11 of the first lens L1 may be convex or concave in a paraxial region. Here, the paraxial region refers to a portion close to an optical axis and refers to a portion close to an optical axis in the effective diameter of the lens. The first lens L1 has a meniscus shape convex toward the object side in the effective diameter. Both the object-side surface S11 and the sensor-side surface S12 of the first lens L1 are formed as aspheric surfaces. The first lens L1 is formed of plastic, and the plastic forming the first lens L1 preferably has a refractive index larger than 1.5 and smaller than 1.6.

The second lens L2 has positive (+) refractive power. The object-side surface S21 of the second lens L2 is concave in the effective diameter, and the sensor-side surface S22 is convex in the paraxial region. The object-side surface S21 of the second lens L2 may be convex or concave in the paraxial region. Both the object-side surface S21 and the sensor-side surface S22 of the second lens L2 are formed as aspheric surfaces. The second lens L2 is formed of plastic, and the plastic forming the second lens L2 preferably has a refractive index larger than 1.5 and smaller than 1.6.

The third lens L3 has positive refractive power. The object-side surface S31 of the third lens L3 is convex in the paraxial region and the sensor-side surface S32 is also convex in the paraxial region. Both the object-side surface S31 and the sensor-side surface S32 of the third lens L3 are formed as aspheric surfaces. The third lens L3 is formed of plastic, and the plastic forming the third lens L3 is preferably a refractive index greater than 1.5 and smaller than 1.6.

The fourth lens L4 has negative refractive power. The object-side surface S41 of the fourth lens L4 is convex in the paraxial region and is concave on the periphery in the effective diameter of the paraxial region. Accordingly, the object-side surface S41 of the fourth lens L4 is substantially concave in the entire effective diameter but a curvature radius based on the paraxial region has a positive value. The sensor-side surface S42 of the fourth lens L4 is convex in the paraxial region. Both the object-side surface S41 and the sensor-side surface S42 of the fourth lens L4 are formed as aspheric surfaces.

The fourth lens L 4 is formed of plastic. The fourth lens L4 is formed of a material having high refractive index, relative to the first, second, third, and fifth lenses. Specifically, the fourth lens L4 is formed of a material having a refractive index of 1.6 or greater. More preferably, the fourth lens L4 may be formed of a material having a refractive index of 1.65 or greater.

The fifth lens L5 has positive refractive power. The sensor-side surface S52 of the fifth lens L5 is convex in the paraxial region. Both the object-side surface S51 and the sensor-side surface S52 of the fifth lens L5 are formed as aspheric surfaces. The fifth lens L5 is formed of plastic, and the plastic forming the fifth lens L5 preferably has a refractive index larger than 1.5 and smaller than 1.6.

The sixth lens L6 has negative refractive power. The object-side surface S61 of the sixth lens L6 is convex in the paraxial region and concave on the periphery in the effective diameter of the paraxial region. Accordingly, the object-side surface S61 of the sixth lens L6 is substantially concave in the entire effective diameter but has a positive radius of curvature with respect to the paraxial region. The sensor-side surface S62 of the sixth lens L6 is convex in the paraxial region. Both the object-side surface S61 and the sensor-side surface S62 of the sixth lens L6 are formed as aspheric surfaces.

The sixth lens L6 is formed of plastic. The sixth lens L6 is formed of a material having a high refractive index, relative to the first, second, third, and fifth lenses. Specifically, the sixth lens L6 is formed of a material having a refractive index of 1.6 or greater. More preferably, the sixth lens L6 may be formed of a material having a refractive index of 1.65 or greater.

Although both the fourth lens L4 and the sixth lens L6 are formed of a material having a refractive index of 1.6 or greater, the refractive index of the material forming the fourth lens L4 may be greater than the refractive index of the material forming the sixth lens.

Further, the optical lens system of the present disclosure satisfies the following conditional expression.

$$-1.4 < \tan \theta / f < -1.1 \qquad \text{<Conditional Expression 1>}$$

Here, θ is an angle of view of the optical lens system in a diagonal direction, and f is a focal length of the optical lens system.

If the conditional expression 1 is satisfied, the optical lens system may realize wide-angle performance. In this embodiment, the angle of view in the diagonal direction is 120.0 degrees, which realizes the wide angle performance. As in the present embodiment, in a state in which the angle of view θ is sufficiently large, the focal length f is preferably within a range satisfying Conditional Expression 1. If the focal length f is so long as to exceed a lower limit of Conditional Expression 1, a total track length TTL of the optical lens system may be lengthened. Also, if the focal length f is so short as to exceed an upper limit of Conditional Expression 1, a spherical aberration and a coma aberration may increase to degrade optical performance.

$$4.0 < TTL/BFL < 6.0 \qquad \text{<Conditional Expression 2>}$$

Here, TTL is a distance on the optical axis from the object-side surface S11 of the first lens L1 to the sensor IS, and BFL is a distance on the optical axis from the sensor-side surface S62 of the sixth lens L6 to the sensor IS.

If Conditional Expression 2 is satisfied, the total track distance TTL of the optical lens system is limited. As a result, a height of a camera module equipped with the optical lens system of the present disclosure may be reduced. This may advantageously make an electronic device in which the camera module is mounted slimmer.

$$-1.7 < f1/f < -1.4 \qquad \text{<Conditional Expression 3>}$$

Here, f1 is a focal length of the first lens L1 and f is a focal length of the optical lens system.

If Conditional Expression 3 is satisfied, an optical lens system having a wide angle and excellent optical performance may be manufactured.

$$50 < (V1+V2)/2 < 60 \qquad \text{<Conditional Expression 4>}$$

Here, V1 is the Abbe number of the first lens L1, and V2 is the Abbe number of the second lens L2.

The first lens L1 and the second lens L2 may be formed of a material having the Abbe number of 50 or greater on average. Thus, a chromatic aberration of the optical lens system may be corrected effectively. In addition, through this configuration, low manufacturing cost may be maintained.

$$30.0 \text{ deg} < CRA(MAX) < 35.0 \text{ deg} \qquad \text{<Conditional Expression 5>}$$

Here, CRA (MAX) is a maximum value of a chief ray angle of the optical lens system.

If Conditional Expression 5 is satisfied, the optical lens system advantageously has a wide angle and excellent optical performance.

$$0.2 < FSL/TTL < 0.3 \qquad \text{<Conditional Expression 6>}$$

Here, FSL is a distance between the object-side surface S11 of the first lens L1 to the aperture S on the optical axis, and TTL is a distance from the object-side surface S11 of the first lens L1 to the sensor IS on the optical axis.

Conditional Expression 6 defines the position of the aperture S in the optical lens system. If Conditional Expression 6 is satisfied, the aperture S is substantially located near the first lens L1 and the second lens L2.

The following table describes optical characteristics of the optical lens system according to a first embodiment of the present disclosure illustrated in FIG. 1.

TABLE 1

|  |  | Component | | | | |
|---|---|---|---|---|---|---|
|  |  | r | d | N | f | V |
| First lens(L1) | S11* | −17.3708 | 0.2500 | 1.5340 | −2.0921 | 55.8559 |
|  | S12* | 1.2000 | 0.3305 |  |  |  |
| Second lens(L2) | S21* | 8.1705 | 0.3167 | 1.5465 | 3.0453 | 56.0928 |
|  | S22* | −2.0614 | 0.1000 |  |  |  |
| Aperture S |  | Infinity | 0.1000 |  |  |  |
| Third lens (L3) | S31* | 2.2396 | 0.4741 | 1.5465 | 1.6724 | 56.0928 |
|  | S32* | −1.4286 | 0.1000 |  |  |  |
| Fourth lens (L4) | S31* | 3.0710 | 0.2300 | 1.6574 | −3.4545 | 21.4744 |
|  | S32* | 1.2668 | 0.2079 |  |  |  |

TABLE 1-continued

|  |  | Component | | | | |
|---|---|---|---|---|---|---|
|  |  | r | d | N | f | V |
| Fifth lens (L5) | S51* | −2.2194 | 0.6208 | 1.5465 | 1.5668 | 56.0928 |
|  | S52* | −0.6789 | 0.1000 |  |  |  |
| Sixth lens (L6) | S61* | 1.3895 | 0.3600 | 1.6455 | −2.0625 | 23.5165 |
|  | S62* | 0.6108 | 0.2300 |  |  |  |
| Focal Length(F) |  |  |  |  | 1.4315 |  |
| Fno |  |  |  |  | 1.9800 |  |
| CRA(MAX) |  |  |  |  | 33.9907 |  |
| TTL |  |  |  |  | 3.9200 |  |
| DFOV |  |  |  |  | 120.0 |  |

In the above table, * on the lens surface indicates that the corresponding lens surface is aspheric. In the above table, r is a radius of curvature of the corresponding lens surface, d is a thickness of the corresponding lens on the optical axis when the corresponding lens surface is the object-side surface, or a distance between an exit surface of the corresponding lens to a next component (lens, aperture S, or filter) when the corresponding lens surface is a sensor-side surface. Thus, d of S22 refers to a distance between the sensor-side surface S22 of the second lens L2 and the aperture S located between the second lens L2 and the third lens L3. Also, d of S62 refers to a distance between the sensor-side surface S62 of the sixth lens L6 and a filter located on a rear side of the sixth lens L6. N is a refractive index of the corresponding lens, f is a focal length of the corresponding lens, and V is the Abbe number of the corresponding lens. Here, a distance unit of r, d, and f is mm.

The focal length F is a focal length of the entire optical lens system, CRA is a maximum value of the chief ray angle of the optical lens system, TTL is a total track length of the optical lens system, and, specifically, a distance on the optical axis from the object-side surface S11 of the first lens L1 to the sensor IS, and DFOV is an angle of view of the optical lens system in the diagonal direction. Here, a unit of F and TTL is mm, and an angle of CRA and DFOV is degree.

The aspheric surfaces of the lens surfaces of the optical lens system according to the first embodiment of the present disclosure illustrated in FIG. 1 satisfies the following aspheric surface equation.

$$z = \frac{y^2}{R\left(1 + \sqrt{1 - (1+k)y^2/R^2}\right)} + A_2 y^2 + A_4 y^4 + A_6 y^6 + A_8 y^8 + A_{10} y^{10} + A_{12} y^{12} \quad <\text{Equation}>$$

Here, z denotes a distance from an apex of a lens in an optical axis direction, and y denotes a distance to a direction perpendicular to the optical axis. R denotes a radius of curvature at the apex of the lens, and K denotes a conic constant. $A_2$ to $A_{12}$ denote aspheric surface coefficients, respectively.

The following table is a table regarding the aspheric surface coefficients of the aspheric surfaces of the optical lens system according to the first embodiment of the present disclosure illustrated in FIG. 1.

TABLE 2

|  | K | A2 | A4 | A6 | A8 | A10 | A12 |
|---|---|---|---|---|---|---|---|
| S11 | 0.0000 | 0.4898 | −0.8740 | 0.6921 | −0.2610 | 0.0423 | 0.0000 |
| S12 | 0.1928 | 0.7390 | 2.1821 | −21.2720 | 82.9568 | −173.1436 | 147.0673 |
| S21 | 99.0000 | 0.0455 | −0.0735 | −2.6281 | 4.4360 | −12.3945 | 12.5269 |
| S22 | 0.0000 | 0.3204 | −3.2054 | 18.9712 | −82.4468 | 179.3358 | −153.5533 |
| S31 | 10.9585 | 0.1599 | 0.1465 | −6.9104 | 17.3975 | −8.4085 | −46.2617 |
| S32 | 3.0009 | −0.2435 | 1.7038 | −1.5479 | −18.0237 | 58.9576 | −58.6302 |
| S41 | 0.0000 | −1.3350 | 0.1172 | 17.4425 | −93.1034 | 191.9022 | −136.7373 |
| S42 | 1.0251 | −0.9266 | 0.2572 | 5.2783 | −19.0560 | 26.7389 | −13.7392 |
| S51 | 6.0917 | 0.8364 | −2.3802 | 5.1492 | −4.2636 | −1.2787 | 2.8543 |
| S52 | −0.7977 | 0.6209 | −0.1424 | −2.6312 | 6.2935 | −5.3817 | 1.5956 |
| S61 | −31.1830 | 0.0301 | −0.9605 | 1.0915 | −0.7186 | 0.2954 | −0.0527 |
| S62 | −5.9769 | −0.1524 | −0.0642 | 0.1561 | −0.1148 | 0.0381 | −0.0051 |

Referring to FIG. 1 and the above two tables, each lens of the optical lens system according to the first embodiment of the present disclosure satisfies the above-described characteristics.

The following table shows calculation of the values of the Conditional Expression 1 to Conditional Expression 6 described above in the optical lens system of the present embodiment.

TABLE 3

| Conditional Expression | Target value | Target value of first embodiment |
|---|---|---|
| Conditional Expression 1 | −1.4 < tanθ/f < −1.1 | tanθ/f | −1.2100 |
| Conditional Expression 2 | 4.0 < TTL/BFL < 6.0 | TTL/BFL | 5.3699 |
| Conditional Expression 3 | −1.7 < f1/f < −1.4 | f1/f | −1.4615 |
| Conditional Expression 4 | 50 < (V1 + V2)/2 < 60 | (V1 + V2)/2 | 56.0928 |
| Conditional Expression 5 | 30.0deg < CRA(MAX) < 35.0deg | CRA (MAX) | 33.9907 |
| Conditional Expression 6 | 0.2 < FSL/TTL < 0.3 | FSL/TTL | 0.2544 |

As illustrated in the above table, it can be seen that the optical lens system of the first embodiment of the present disclosure satisfies all of Conditional Expression 1 to Conditional Expression 6.

Hereinafter, an optical lens system according to a second embodiment of the present disclosure will be described with reference to FIG. 2.

Figure 2:
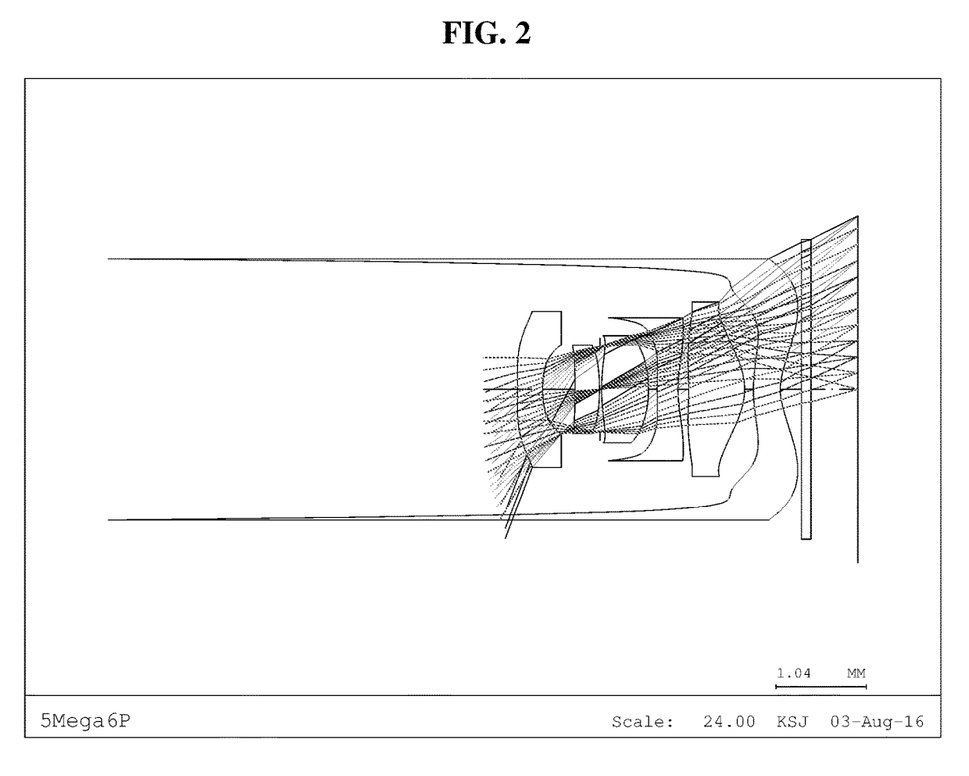
FIG. 2 is view illustrating a configuration of lenses of an optical lens system according to a second embodiment of the present disclosure.

FIG. 2 is a view illustrating a configuration of an optical lens system according to an embodiment of the present disclosure.

The following table shows optical characteristics of the optical lens system according to the second embodiment of the present disclosure illustrated in FIG. 2.

TABLE 4

| | | Component | | | | |
|---|---|---|---|---|---|---|
| | | r | d | N | f | V |
| First lens (L1) | S11* | −10.4623 | 0.2907 | 1.5340 | −2.3046 | 55.8559 |
| | S12* | 1.4083 | 0.3746 | | | |
| Second lens (L2) | S21* | −5.4394 | 0.2803 | 1.5465 | 6.2751 | 56.0928 |
| | S22* | −2.1416 | 0.0049 | | | |
| Aperture | S | Infinity | 0.0201 | | | |
| Third lens (L3) | S31* | 2.2204 | 0.5400 | 1.5465 | 1.6528 | 56.0928 |
| | S32* | −1.3918 | 0.1000 | | | |
| Fourth lens (L4) | S31* | 3.6368 | 0.2400 | 1.6574 | −4.1334 | 21.4744 |
| | S32* | 1.5146 | 0.1244 | | | |
| Fifth lens (L5) | S51* | −3.7041 | 0.6500 | 1.5465 | 1.3378 | 56.0928 |
| | S52* | −0.6485 | 0.1000 | | | |
| Sixth lens (L6) | S61* | 1.4867 | 0.3100 | 1.6455 | −1.8358 | 23.5165 |
| | S62* | 0.6055 | 0.2450 | | | |
| Focal Length(F) | | | | | 1.4067 | |
| Fno | | | | | 1.9800 | |

TABLE 4-continued

| | Component | | | | |
|---|---|---|---|---|---|
| | r | d | N | f | V |
| CRA(MAX) | | | | 34.0061 | |
| TTL | | | | 3.9300 | |
| DFOV | | | | 120.0 | |

In the above table, * on the lens surface indicates that the corresponding lens surface is aspheric. In the above table, r is a radius of curvature of the corresponding lens surface, d is a thickness of the corresponding lens on the optical axis when the corresponding lens surface is the object-side surface, or a distance between an exit surface of the corresponding lens to a next component (lens, aperture S, or filter) when the corresponding lens surface is a sensor-side surface. Thus, d of S22 refers to a distance between the sensor-side surface S22 of the second lens L2 and the aperture S located between the second lens L2 and the third lens L3. Also, d of S62 refers to a distance between the sensor-side surface S62 of the sixth lens L6 and a filter located on a rear side of the sixth lens L6. N is a refractive index of the corresponding lens, f is a focal length of the corresponding lens, and V is the Abbe number of the corresponding lens. Here, a distance unit of r, d, and f is mm.

The focal length F is a focal length of the entire optical lens system, CRA is a maximum value of the chief ray angle of the optical lens system, TTL is a total track length of the optical lens system, and, specifically, a distance on the optical axis from the object-side surface S11 of the first lens L1 to the sensor IS, and DFOV is an angle of view of the optical lens system in the diagonal direction. Here, a unit of F and TTL is mm, and an angle of CRA and DFOV is degree.

The aspheric surfaces of the lens surfaces of the optical lens system according to the second embodiment of the present disclosure illustrated in FIG. 2 satisfies the following aspheric surface equation.

$$z = \frac{y^2}{R\left(1 + \sqrt{1 - (1+k)y^2/R^2}\right)} + A_2 y^2 + \quad \text{<Equation>}$$

$$A_4 y^4 + A_6 y^6 + A_8 y^8 + A_{10} y^{10} + A_{12} y^{12}$$

Here, z denotes a distance from an apex of a lens in an optical axis direction, and y denotes a distance to a direction perpendicular to the optical axis. R denotes a radius of curvature at the apex of the lens, and K denotes a conic constant. $A_2$ to $A_{12}$ denote aspheric surface coefficients, respectively.

The following table is a table regarding the aspheric surface coefficients of the aspheric surfaces of the optical lens system according to the second embodiment of the present disclosure illustrated in FIG. 2.

TABLE 5

| | K | A2 | A4 | A6 | A8 | A10 | A12 |
|---|---|---|---|---|---|---|---|
| S11 | 79.7597 | 0.9247 | −1.5398 | 2.2304 | −1.9774 | 0.4752 | 0.1366 |
| S12 | 4.1656 | 1.4744 | 0.7865 | −12.3596 | 77.1424 | −104.1041 | −64.4262 |
| S21 | 89.5524 | 0.1507 | −1.0051 | 7.2134 | −68.4983 | 294.7238 | −473.0470 |
| S22 | 7.4141 | 0.1356 | −6.8708 | 50.3921 | −224.6766 | 547.6092 | −563.7115 |
| S31 | −10.9074 | 0.3414 | −6.6936 | 49.2324 | −224.8519 | 552.1896 | −577.6610 |
| S32 | 3.1002 | −0.3378 | 0.6956 | −0.9107 | −6.1920 | 30.5764 | −34.8779 |
| S41 | 2.5841 | −1.1934 | 0.2269 | 3.2845 | −18.6004 | 56.5935 | −60.1168 |
| S42 | 1.0995 | −0.6176 | −0.0253 | 1.6043 | −5.3225 | 8.7383 | −5.5099 |
| S51 | 15.3891 | 0.7080 | −0.5591 | −1.1182 | 3.2463 | −2.9957 | 1.0962 |
| S52 | −0.9238 | 1.0525 | −1.9917 | 3.3908 | −3.2766 | 1.7025 | −0.3525 |
| S61 | −29.1487 | 0.1778 | −1.5273 | 2.9688 | −3.7867 | 2.4813 | −0.5997 |
| S62 | −5.6576 | −0.2074 | 0.1029 | −0.0819 | 0.0436 | −0.0150 | 0.0023 |

Referring to FIG. 2 and the above two tables, each lens of the optical lens system according to the second embodiment of the present disclosure satisfies the above-described characteristics.

The following table shows calculation of the values of the Conditional Expression 1 to Conditional Expression 6 described above in the optical lens system of the present embodiment.

TABLE 6

| | Conditional Expression | Target value | Target value of second embodiment |
|---|---|---|---|
| Conditional Expression 1 | −1.4 < tanθ/f < −1.1 | tanθ/f | −1.2313 |
| Conditional Expression 2 | 4.0 < TTL/BFL < 6.0 | TTL/BFL | 4.3911 |
| Conditional Expression 3 | −1.7 < f1/f < −1.4 | f1/f | −1.6383 |
| Conditional Expression 4 | 50 < (V1 + V2)/2 < 60 | (V1 + V2)/2 | 56.0928 |
| Conditional Expression 5 | 30.0deg < CRA(MAX) < 35.0deg | CRA (MAX) | 34.0061 |
| Conditional Expression 6 | 0.2 < FSL/TTL < 0.3 | FSL/TTL | 0.2419 |

As illustrated in the above table, it can be seen that the optical lens system of the second embodiment of the present disclosure satisfies all of Conditional Expression 1 to Conditional Expression 6.

Hereinafter, an optical lens system according to a third embodiment of the present disclosure will be described with reference to FIG. 3.

Figure 3:
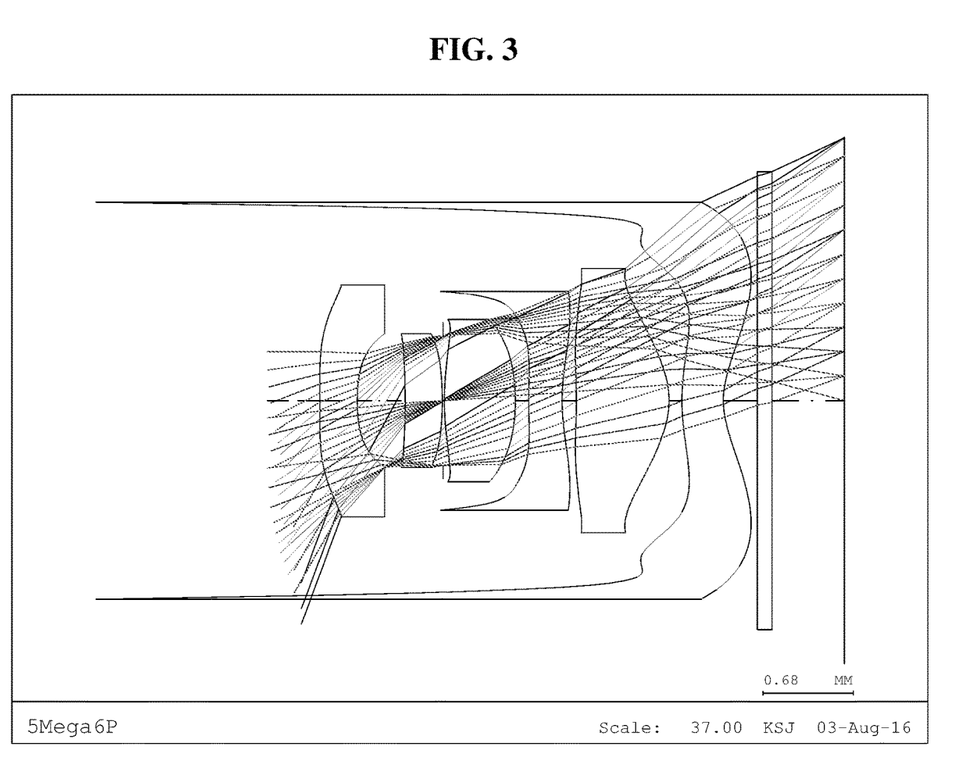
FIG. 3 is a view illustrating a configuration of lenses of an optical lens system according to a third embodiment of the present disclosure.

FIG. 3 is a view illustrating a configuration of an optical lens system according to an embodiment of the present disclosure.

The following table shows optical characteristics of the optical lens system according to the third embodiment of the present disclosure illustrated in FIG. 3.

TABLE 7

|  |  | Component | | | | |
|---|---|---|---|---|---|---|
|  |  | r | d | N | f | V |
| First lens | S11* | −10.6473 | 0.2800 | 1.5340 | −2.3608 | 55.8559 |
| (L1) | S12* | 1.4431 | 0.3579 |  |  |  |
| Second lens | S21* | −5.8246 | 0.2779 | 1.5465 | 6.4988 | 56.0928 |
| (L2) | S22* | −2.2435 | 0.0067 |  |  |  |
| Aperture | S | Infinity | 0.0096 |  |  |  |
| Third lens | S31* | 2.2748 | 0.5341 | 1.5465 | 1.6711 | 56.0928 |
| (L3) | S32* | −1.3992 | 0.1000 |  |  |  |
| Fourth lens | S31* | 3.8787 | 0.2500 | 1.6574 | −4.1509 | 21.4744 |
| (L4) | S32* | 1.5609 | 0.1068 |  |  |  |
| Fifth lens | S51* | −3.7315 | 0.6921 | 1.5465 | 1.2963 | 56.0928 |
| (L5) | S52* | −0.6344 | 0.1000 |  |  |  |
| Sixth lens | S61* | 1.4857 | 0.3100 | 1.6455 | −1.7690 | 23.5165 |
| (L6) | S62* | 0.5928 | 0.2550 |  |  |  |
|  | Focal Length(F) |  |  |  | 1.4268 |  |
|  | Fno |  |  |  | 1.9800 |  |
| CRA(MAX) |  |  |  |  | 33.5000 |  |
| TTL |  |  |  |  | 3.9300 |  |
| DFOV |  |  |  |  | 120.0 |  |

In the above table, * on the lens surface indicates that the corresponding lens surface is aspheric. In the above table, r is a radius of curvature of the corresponding lens surface, d is a thickness of the corresponding lens on the optical axis when the corresponding lens surface is the object-side surface, or a distance between an exit surface of the corresponding lens to a next component (lens, aperture S, or filter) when the corresponding lens surface is a sensor-side surface. Thus, d of S22 refers to a distance between the sensor-side surface S22 of the second lens L2 and the aperture S located between the second lens L2 and the third lens L3. Also, d of S62 refers to a distance between the sensor-side surface S62 of the sixth lens L6 and a filter located on a rear side of the sixth lens L6. N is a refractive index of the corresponding lens, f is a focal length of the corresponding lens, and V is the Abbe number of the corresponding lens. Here, a distance unit of r, d, and f is mm.

The focal length F is a focal length of the entire optical lens system, CRA is a maximum value of the chief ray angle of the optical lens system, TTL is a total track length of the optical lens system, and, specifically, a distance on the optical axis from the object-side surface S11 of the first lens L1 to the sensor IS, and DFOV is an angle of view of the optical lens system in the diagonal direction. Here, a unit of F and TTL is mm, and an angle of CRA and DFOV is degree.

The aspheric surfaces of the lens surfaces of the optical lens system according to the third embodiment of the present disclosure illustrated in FIG. 3 satisfies the following aspheric surface equation.

$$z = \frac{y^2}{R\left(1 + \sqrt{1-(1+k)y^2/R^2}\right)} + A_2 y^2 + A_4 y^4 + A_6 y^6 + A_8 y^8 + A_{10} y^{10} + A_{12} y^{12} \quad <\text{Equation}>$$

Here, z denotes a distance from an apex of a lens in an optical axis direction, and y denotes a distance to a direction perpendicular to the optical axis. R denotes a radius of curvature at the apex of the lens, and K denotes a conic constant. $A_2$ to $A_{12}$ denote aspheric surface coefficients, respectively.

The following table is a table regarding the aspheric surface coefficients of the aspheric surfaces of the optical lens system according to the third embodiment of the present disclosure illustrated in FIG. 3.

TABLE 8

|  | K | A2 | A4 | A6 | A8 | A10 | A12 |
|---|---|---|---|---|---|---|---|
| S11 | 79.7597 | 0.9435 | −1.6126 | 2.3962 | −2.2033 | 0.5417 | 0.1752 |
| S12 | 4.5724 | 1.4910 | 0.7094 | −13.8033 | 96.7733 | −197.2828 | 93.2161 |
| S21 | 99.0000 | 0.1507 | −1.0051 | 7.2134 | −68.4983 | 294.7238 | −473.0470 |
| S22 | 7.8248 | 0.1911 | −8.3799 | 63.8263 | −288.1291 | 702.8642 | −720.4247 |
| S31 | −10.9074 | 0.4015 | −7.9098 | 60.4833 | −274.3843 | 663.8063 | −674.1102 |
| S32 | 3.0562 | −0.3755 | 1.0932 | −1.7275 | −8.1147 | 41.5280 | −48.0062 |
| S41 | 2.5841 | −1.2663 | 0.7258 | 2.3696 | −19.9269 | 61.4991 | −63.4491 |
| S42 | 1.1062 | −0.6384 | 0.3601 | 0.3663 | −3.5761 | 7.2819 | −4.7727 |
| S51 | 15.2312 | 0.7012 | −0.4333 | −1.7096 | 4.0617 | −3.2191 | 0.9294 |
| S52 | −0.9110 | 1.0605 | −2.1130 | 3.7178 | −4.0138 | 2.6114 | −0.7457 |
| S61 | −29.1487 | 0.1870 | −1.5486 | 2.9084 | −3.5846 | 2.2463 | −0.5135 |
| S62 | −5.4719 | −0.1914 | 0.0529 | −0.0151 | −0.0042 | 0.0028 | −0.0006 |

Referring to FIG. 3 and the above two tables, each lens of the optical lens system according to the third embodiment of the present disclosure satisfies the above-described characteristics.

The following table shows calculation of the values of the Conditional Expression 1 to Conditional Expression 6 described above in the optical lens system of the present embodiment.

TABLE 9

|  | Conditional Expression | Target value | Target value of third embodiment |
|---|---|---|---|
| Conditional Expression 1 | $-1.4 < \tan\theta/f < -1.1$ | $\tan\theta/f$ | −1.2139 |
| Conditional Expression 2 | $4.0 < TTL/BFL < 6.0$ | TTL/BFL | 4.3425 |
| Conditional Expression 3 | $-1.7 < f1/f < -1.4$ | f1/f | −1.6546 |
| Conditional Expression 4 | $50 < (V1 + V2)/2 < 60$ | (V1 + V2)/2 | 56.0928 |
| Conditional Expression 5 | $30.0\deg < CRA(MAX) < 35.0\deg$ | CRA(MAX) | 33.5000 |
| Conditional Expression 6 | $0.2 < FSL/TTL < 0.3$ | FSL/TTL | 0.2347 |

As illustrated in the above table, it can be seen that the optical lens system of the third embodiment of the present disclosure satisfies all of Conditional Expression 1 to Conditional Expression 6.

Hereinafter, an optical lens system according to a fourth embodiment of the present disclosure will be described with reference to FIG. 4.

Figure 4:
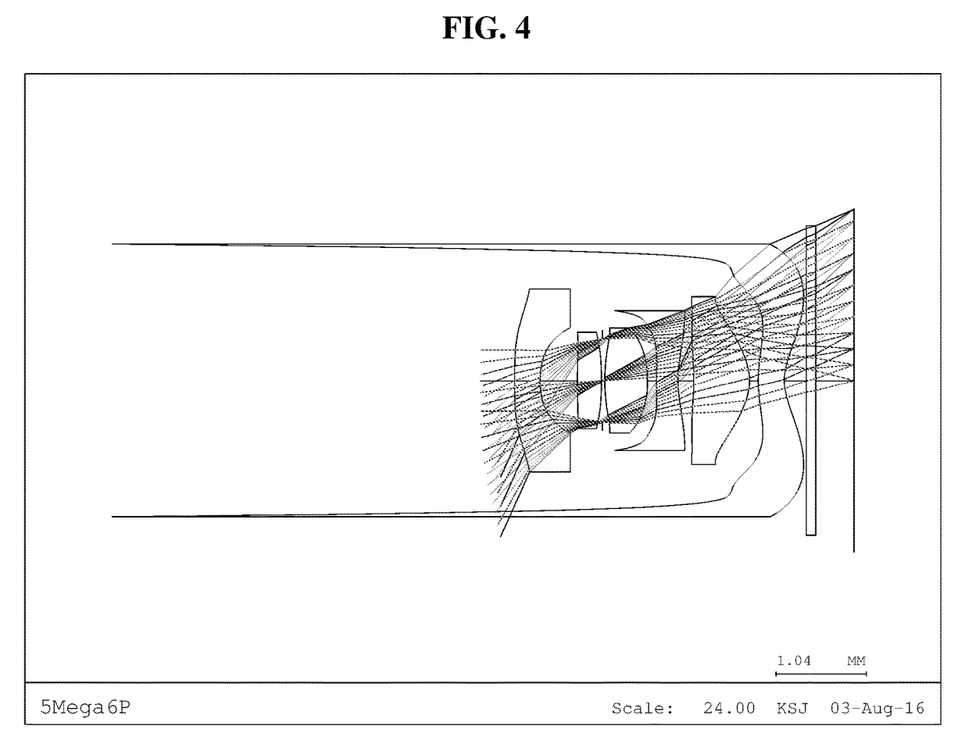
FIG. 4 is view illustrating a configuration of lenses of an optical lens system according to a fourth embodiment of the present disclosure.

FIG. 4 is a view illustrating a configuration of an optical lens system according to an embodiment of the present disclosure.

The following table shows optical characteristics of the optical lens system according to the fourth embodiment of the present disclosure illustrated in FIG. 4.

TABLE 10

|  |  | Component |  |  |  |  |
|---|---|---|---|---|---|---|
|  |  | r | d | N | f | V |
| First lens (L1) | S11* | 13.2691 | 0.2940 | 1.5340 | −2.0987 | 55.8559 |
|  | S12* | 1.0255 | 0.4287 |  |  |  |
| Second lens (L2) | S21* | 7.7431 | 0.2804 | 1.5465 | 3.7927 | 56.0928 |
|  | S22* | −2.7942 | 0.0100 |  |  |  |
| Aperture S |  | Infinity | Infinity | 0.0283 |  |  |
| Third lens (L3) | S31* | 2.7426 | 0.4921 | 1.5465 | 1.7062 | 56.0928 |
|  | S32* | −1.3231 | 0.1000 |  |  |  |

TABLE 10-continued

|  |  | Component |  |  |  |  |
|---|---|---|---|---|---|---|
|  |  | r | d | N | f | V |
| Fourth lens (L4) | S31* | 3.0078 | 0.2500 | 1.6574 | −4.0956 | 21.4744 |
|  | S32* | 1.3739 | 0.1814 |  |  |  |
| Fifth lens (L5) | S51* | −2.8358 | 0.6500 | 1.5465 | 1.2903 | 56.0928 |
|  | S52* | −0.6105 | 0.1000 |  |  |  |
| Sixth lens (L6) | S61* | 1.4439 | 0.3000 | 1.6455 | −1.6588 | 23.5165 |
|  | S62* | 0.5647 | 0.2550 |  |  |  |
| Focal Length(F) |  |  |  |  | 1.3910 |  |
| Fno |  |  |  |  | 1.9800 |  |
| CRA(MAX) |  |  |  |  | 33.6612 |  |
| TTL |  |  |  |  | 3.9200 |  |
| DFOV |  |  |  |  | 120.6000 |  |

In the above table, * on the lens surface indicates that the corresponding lens surface is aspheric. In the above table, r is a radius of curvature of the corresponding lens surface, d is a thickness of the corresponding lens on the optical axis when the corresponding lens surface is the object-side surface, or a distance between an exit surface of the corresponding lens to a next component (lens, aperture S, or filter) when the corresponding lens surface is a sensor-side surface. Thus, d of S22 refers to a distance between the sensor-side surface S22 of the second lens L2 and the aperture S located between the second lens L2 and the third lens L3. Also, d of S62 refers to a distance between the sensor-side surface S62 of the sixth lens L6 and a filter located on a rear side of the sixth lens L6. N is a refractive index of the corresponding lens, f is a focal length of the corresponding lens, and V is the Abbe number of the corresponding lens. Here, a distance unit of r, d, and f is mm.

The focal length F is a focal length of the entire optical lens system, CRA is a maximum value of the chief ray angle of the optical lens system, TTL is a total track length of the optical lens system, and, specifically, a distance on the optical axis from the object-side surface S11 of the first lens L1 to the sensor IS, and DFOV is an angle of view of the optical lens system in the diagonal direction. Here, a unit of F and TTL is mm, and an angle of CRA and DFOV is degree.

The aspheric surfaces of the lens surfaces of the optical lens system according to the fourth embodiment of the present disclosure illustrated in FIG. 4 satisfies the following aspheric surface equation.

$$z = \frac{y^2}{R\left(1 + \sqrt{1 - (1+k)y^2/R^2}\right)} + A_2 y^2 + A_4 y^4 + A_6 y^6 + A_8 y^8 + A_{10} y^{10} + A_{12} y^{12}.$$ <Equation>

Here, z denotes a distance from an apex of a lens in an optical axis direction, and y denotes a distance to a direction perpendicular to the optical axis. R denotes a radius of curvature at the apex of the lens, and K denotes a conic constant. $A_2$ to $A_{12}$ denote aspheric surface coefficients, respectively.

The following table is a table regarding the aspheric surface coefficients of the aspheric surfaces of the optical lens system according to the fourth embodiment of the present disclosure illustrated in FIG. 4.

TABLE 11

|  | K | $A_2$ | $A_4$ | $A_6$ | $A_8$ | $A_{10}$ | $A_{12}$ |
|---|---|---|---|---|---|---|---|
| S11 | 79.7597 | 0.4364 | −0.5851 | 0.5023 | −0.3315 | 0.0985 | 0.0000 |
| S12 | 1.0585 | 0.7749 | 0.4016 | −0.7812 | −6.7496 | 54.0967 | −88.9830 |
| S21 | 99.0000 | −0.1295 | 0.6667 | −10.3445 | 50.5502 | −134.7000 | 139.2732 |
| S22 | 1.3375 | 0.4765 | −6.0989 | 34.6891 | −128.2281 | 259.9933 | −198.2307 |
| S31 | 10.3758 | 0.6119 | −6.5676 | 38.9336 | −159.1419 | 359.8946 | −349.4029 |
| S32 | 2.8251 | −0.6955 | 3.2721 | −9.7723 | 17.1528 | −11.0797 | 0.2838 |
| S41 | 2.4246 | −1.6133 | 1.9718 | −0.9122 | −12.8692 | 49.7979 | −53.7428 |
| S42 | 1.0834 | −0.7537 | 0.1200 | 2.8858 | −9.6489 | 13.9858 | −8.1411 |
| S51 | 9.7082 | 0.5531 | −0.5708 | 0.5006 | −0.2154 | −0.1125 | 0.3401 |
| S52 | −0.8839 | 0.9743 | −1.9907 | 3.5704 | −3.9464 | 2.6165 | −0.7040 |
| S61 | −29.1487 | 0.0522 | −1.0440 | 1.9564 | −2.2465 | 1.3069 | −0.2813 |
| S62 | −5.3262 | −0.2044 | 0.0899 | −0.0186 | −0.0237 | 0.0153 | −0.0028 |

Referring to FIG. 4 and the above two tables, each lens of the optical lens system according to the fourth embodiment of the present disclosure satisfies the above-described characteristics.

The following table shows calculation of the values of the Conditional Expression 1 to Conditional Expression 6 described above in the optical lens system of the present embodiment.

TABLE 12

| | Conditional Expression | Target value | Target value of fourth embodiment |
|---|---|---|---|
| Conditional Expression 1 | $-1.4 < \tan\theta/f < -1.1$ | $\tan\theta/f$ | $-1.2156$ |
| Conditional Expression 2 | $4.0 < TTL/BFL < 6.0$ | TTL/BFL | 4.8696 |
| Conditional Expression 3 | $-1.7 < f1/f < -1.4$ | f1/f | $-1.5088$ |
| Conditional Expression 4 | $50 < (V1 + V2)/2 < 60$ | (V1 + V2)/2 | 56.0928 |
| Conditional Expression 5 | $30.0\deg < CRA(MAX) < 35.0\deg$ | CRA (MAX) | 33.6612 |
| Conditional Expression 6 | $0.2 < FSL/TTL < 0.3$ | FSL/TTL | 0.2585 |

As illustrated in the above table, it can be seen that the optical lens system of the fourth embodiment of the present disclosure satisfies all of Conditional Expression 1 to Conditional Expression 6.

Embodiments of the optical lens system of the present disclosure have been described. The present disclosure is not limited to the above-described embodiments and the accompanying drawings and various modifications and changes may be made by those skilled in the art to which the present disclosure pertains. Therefore, the scope of the present disclosure should be determined by the claims and equivalents of the claims.

What is claimed is:

1. An optical lens system including a first lens, a second lens, a third lens, a fourth lens, a fifth lens, and a sixth lens sequentially arranged from an object side to a sensor side between an object and a sensor on which an image of the object is focused,
   wherein
   the first lens has a negative refractive power and a sensor-side surface of the first lens is concave in a paraxial region,
   the second lens has positive refractive power,
   the third lens has positive refractive power and an object-side surface of the third lens is convex in the paraxial region,
   the fourth lens has refractive power, an object-side surface of the fourth lens is convex in the paraxial region and concave on the periphery of an effective diameter of the paraxial region, a sensor-side surface of the fourth lens is concave in the paraxial region, both an object-side surface and a sensor-side surface of the fourth lens are aspheric,
   the fifth lens has positive refractive power, an object-side surface of the fifth lens is concave in the paraxial region and aspheric,
   the sixth lens has negative refractive power, a sensor-side surface of the sixth lens is concave and has at least one inflection point in the effective diameter, both an object-side surface and a sensor-side surface of the sixth lens are aspheric,
   an aperture is located between the second lens and the third lens, and
   the following conditional expression is satisfied when θ is an angle of view of the optical lens system in a diagonal direction, f is a focal length of the optical lens system, TTL is a distance on an optical axis from the object-side surface of the first lens to the sensor, and BFL is a distance on the optical axis from the sensor-side surface of the sixth lens to the sensor, $-1.4 < \tan\theta/f < -1.1$, and $4.0 < TTL/BFL < 6.0$.   <Conditional Expression>

2. The optical lens system of claim 1, wherein the object-side surface of the sixth lens is convex in the paraxial region and concave on the periphery in the effective diameter of the paraxial region.

3. The optical lens system of claim 1, wherein an object-side surface of the first lens is convex in the effective diameter.

4. The optical lens system of claim 1, wherein an object-side surface of the second lens is concave in the effective diameter.

5. The optical lens system of claim 1, wherein a sensor-side surface of the third lens is convex in the paraxial region.

6. The optical lens system of claim 1, wherein a sensor-side surface of the fifth lens is convex in the paraxial region.

7. The optical lens system of claim 1, wherein the fourth lens is formed of a material having a refractive index of 1.6 or greater.

8. The optical lens system of claim 1, wherein the sixth lens is formed of a material having a refractive index of 1.6 or greater.

9. The optical lens system of claim 1, wherein the fourth lens and the sixth lens are formed of a material having a refractive index of 1.6 or greater, and the refractive index of the material forming the fourth lens is greater than the refractive index of the material forming the sixth lens.

10. The optical lens system of claim 1, wherein the first lens, the second lens, the third lens, and the fifth lens are formed of a material having a refractive index of 1.5 to 1.6.

11. The optical lens system of claim 1, wherein at least one of the fourth lens and the sixth lens is formed of plastic.

12. The optical lens system of claim 1, wherein the fourth lens has negative refractive power.

13. The optical lens system of claim 1, wherein the following conditional expression is further satisfied when f1 is a focal length of the first lens, $-1.7 < f1/f < -1.4$.   <Conditional Expression>

14. The optical lens system of claim 1, wherein the following conditional expression is further satisfied when V1 is the Abbe number of the first lens and V2 is the Abbe number of the second lens, $50 < (V1+V2)/2 < 60$.   <Conditional Expression>

15. The optical lens system of claim 1, wherein the following conditional expression is further satisfied when CRA (MAX) is a maximum value of a chief ray angle of the optical lens system, $30.0 \deg < CRA(MAX) < 35.0 \deg$.   <Conditional Expression>

16. The optical lens system of claim 1, wherein the following conditional expression is further satisfied when FSL is a distance on the optical axis between the object-side surface of the first lens and the aperture, $0.2 < FSL/TTL < 0.3.$  <Conditional Expression> 5

* * * * *